United States Patent [19]

Hatakeyama et al.

[11] 4,441,110

[45] Apr. 3, 1984

[54] PRINTING HEAD PROTECTING DEVICE IN INK JET PRINTER

[75] Inventors: Siro Hatakeyama, Tokyo; Harutaro Oba; Yoshitaka Ukai, both of Shizuoka, all of Japan

[73] Assignees: Tokyo Electric Co., Ltd.; Konishiroku Photo Industry Co., Ltd., both of Tokyo, Japan

[21] Appl. No.: 383,274

[22] Filed: May 28, 1982

[30] Foreign Application Priority Data

| | | | |
|---|---|---|---|
| Jun. 4, 1981 | [JP] | Japan | 56-86136 |
| Jun. 4, 1981 | [JP] | Japan | 56-86137 |
| Jun. 4, 1981 | [JP] | Japan | 56-86138 |

[51] Int. Cl.[3] .............. G01D 15/18

[52] U.S. Cl. .............. 346/140 R

[58] Field of Search .............. 346/140 R, 75

[56] References Cited

U.S. PATENT DOCUMENTS

| | | | |
|---|---|---|---|
| 4,144,537 | 3/1979 | Kimura | 346/140 |
| 4,177,471 | 12/1979 | Mitchell | 346/140 |
| 4,306,245 | 12/1981 | Kasugayama | 346/140 |

*Primary Examiner*—Joseph W. Hartary
*Attorney, Agent, or Firm*—Oblon, Fisher, Spivak, McClelland & Maier

[57] ABSTRACT

An ink jet printer having a printing head (12) with a protection device and an ink receiving member (20) for cleaning the head. When the head is to be cleaned, a parting member moves the protective member so that this member does not contact the cleaning device.

9 Claims, 18 Drawing Figures

PRINTING HEAD PROTECTING DEVICE IN INK JET PRINTER

BACKGROUND OF THE INVENTION

1. Field of the Invention

The present invention relates to an ink jet printer and particularly to a printing head protecting device used in the same.

2. Description of the Prior Art

In conventional drop on-demand type ink jet printers it is required to keep narrow and constant the spacing between the ink jet surface of a printing head and a printing paper. But if this spacing is made narrow, the paper when floated from the platen surface may contact the ink jet surface while the latter is moving for printing, and damage of the printing head may result. This danger may be averted by the provision of a protective plate at a side portion of the ink jet surface so that the protective plate projects slightly from the ink jet surface. In on-demand type ink jet printers there is known the so-called purging technique (see Japanese Patent Laying Open Print No. 150030/1977) in which a cleaning roller for removing air bubbles formed within an ink jet chamber and for cleaning the ink jet surface is disposed in an end position of a reciprocating path of a printing head, the printing head is moved to a position opposed to the cleaning roller and a relatively large amount of ink is jetted toward the same roller to form an ink column between the printing head and the cleaning roller, then this ink column is removed. In this case, the spacing between such cleaning roller and the ink jet surface of the printing head is set narrower than the foregoing spacing between a printing paper and the ink jet surface, therefore in case the printing head provided with a protective plate is moved so as to be opposed to the cleaning roller, the protective plate must be retreated in advance, or else the protective plate may strike the surface or a side of the roller thus resulting in a possible damage of the roller or the protective plate. Therefore, it is necessary for the protective plate to be sure to project when the printing head is opposed to the platen and retreat when the printing head has moved toward the roller.

PURPOSE OF THE INVENTION

It is the first object of the present invention to eliminate interference between a protective plate for protecting a printing head and an ink receiving member for receiving ink droplets in a printer provided with such ink receiving member.

It is the second object of the present invention to position such protective plate in interlock with a reciprocating motion of a carriage.

It is the third object of the present invention to make the operation range of such protective plate adjustable.

It is the fourth object of the present invention to be sure to lock such protective plate during printing operation.

DETAILED DESCRIPTION OF THE PREFERRED EMBODIMENTS

Figure 1:
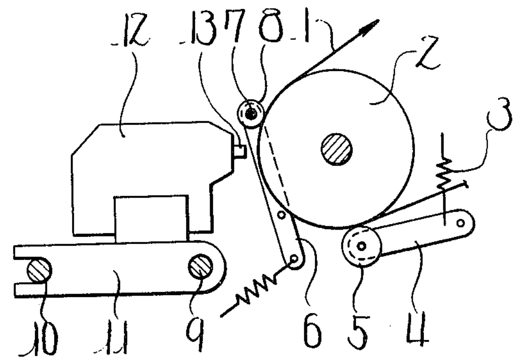
FIG. 1 is a longitudinally sectional side view showing a first embodiment of the present invention.
Figure 2:
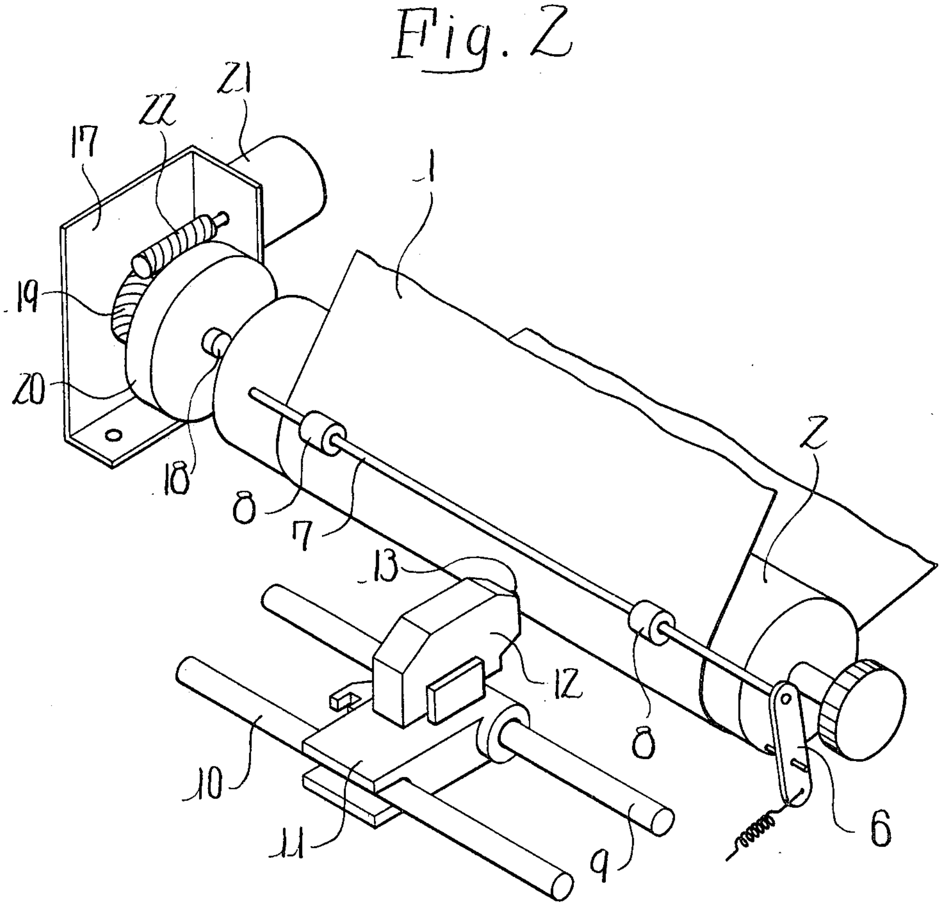
FIG. 2 is an exploded perspective view thereof.
Figure 3:
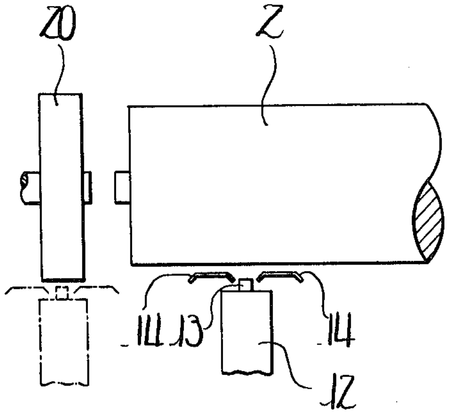
FIG. 3 is a plan view showing the position of a printing head relative to a platen and an ink receiving member.

Referring first to FIGS. 1 through 6, there is shown a first embodiment of the present invention, in which a cylindrical platen 2 for guiding a printing paper 1 is rotatably supported by a frame (not shown), and below the platen 2 is disposed a paper presser roller 5 supported by an arm 4 which is urged by a spring 3. Also above the front of the platen 2 are disposed two axially movable presser rollers 8 which are mounted on a support shaft 7 extending between spring-biased arms 6.

Furthermore, below the front of the platen 2 are disposed two guide shafts 9 and 10 in parallel with each other, on which is mounted a carriage 11 reciprocably. More particularly, the carriage 11 is fitted over the guide shaft 9 through a hole formed therein and over the guide shaft 10 through a horizontal groove formed therein. A printing head 12 is attached to the carriage 11 so that its nozzle surface 13 is spaced by a predetermined distance from the platen 2. Further attached to the carriage 11 is a protective plate 14 formed of an elastic plate, the protective plate 14 having two elastic leg portions 15 projecting in parallel with each other from a base portion of the protective plate. The base portion of the protective plate 14 is fixed to the carriage 11, and at tip ends of the elastic leg portions 15 there are formed protective surfaces 16 projecting by a predetermined distance from the nozzle surface 13 toward the platen 2, the protective surfaces 16 being positioned on both sides of the nozzle surface 13.

A frame 17 is disposed on an extension line of the platen 2, and a shaft 18 is attached to the frame 17, further a worm wheel 19 and a roller 20 serving as an ink receiving member for cleaning are mounted on the shaft 18 integrally rotatably. The worm wheel 19 is in mesh with a worm 22 which is driven by a motor 21. The surface of the roller 20 projects more to this side than the surface of the platen 2. Further attached to the frame 17 is a square bar guide 23 which serves as a parting member. The square bar guide 23 has a prismatic portion having plural ridges 24 and an inclined portion 26 positioned at a tip end, and it is fixed with a machine screw 28 through a vertically long small aperture 27 formed in the frame 17.

Figure 4:
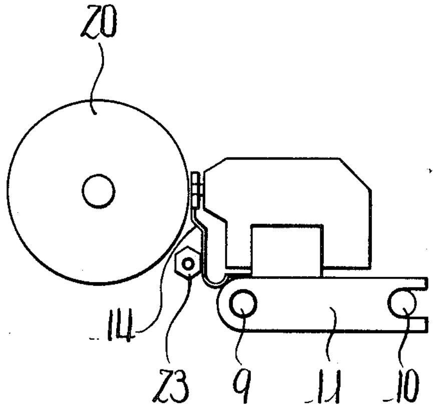
FIG. 4 is a longitudinally sectional side view of a principal portion.

In such a construction, during a normal printing operation, the carriage 11 reciprocates only in the range of the platen 2. Therefore, the printing paper 1 is prevented by the protective plate 14 from floating from the platen 2, whereby the distance from the surface of the printing paper 1 up to the nozzle surface 13 is kept constant. When printing is over, the carriage 11 holding the printing head 12 is moved to the left end, that is, beyond the platen 2. At this time, before the protective plate 14 reaches the position of the roller 20 the inclined portion 26 of the square bar guide 23 abuts the protective plate 14 and moves the latter in a direction away from the platen 2 whereby, as shown in FIG. 4, the spacing between the protective plate 14 and the roller 20 is sure to be ensured by a distance A. Therefore, the protective plate 14 neither strikes nor contacts the roller 20.

Before printing is started, the printing head 12 is operated while rotating the roller 20. It is most preferable that a single ink droplet be held between the surface of the roller 20 and the nozzle surface 13. If the ink droplet is not held therebetween, the amount of ink jet is short, while if it drops as an ink droplet, the amount of ink jet is too large.

Figure 5:
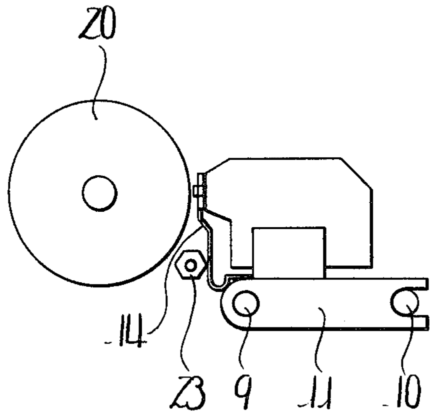
FIG. 5 is a longitudinally sectional side view at the time of adjustment.
Figure 6:
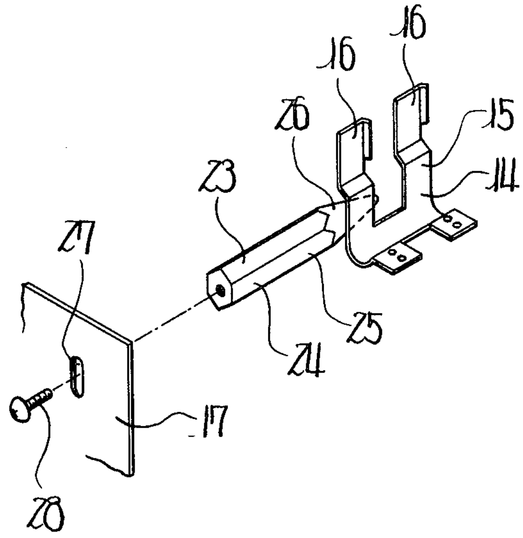
FIG. 6 is an exploded perspective view of a portion.
Figure 7:
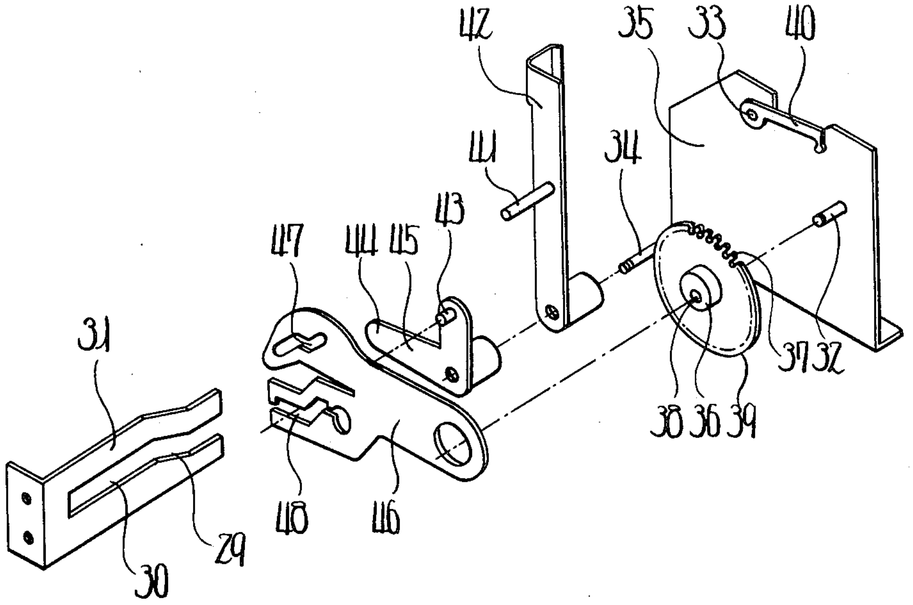
FIG. 7 is an exploded perspective view showing a second embodiment of the present invention.
Figure 8:
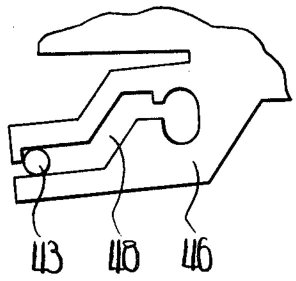
FIG. 8 is a side view thereof.
Figure 9:
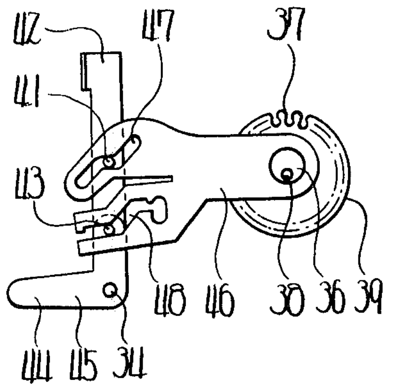
FIG. 9 is a partially enlarged side view.

Furthermore, if the square bar guide 23 is rotated and positioned by loosening the machine screw 28, the spacing between the surface of the roller 20 and the protective plate 14 becomes A′ as shown in FIG. 5, and thus it is adjustable in the range of between A and A′. This adjustment is necessary for correcting an error of each part when assembling the device or for improving safety.

Referring now to FIGS. 7 through 12, there is shown a second embodiment of the present invention. In the following description of the second embodiment the same portions as in the first embodiment will be indicated with the same reference numerals and their explanation will be omitted. In this embodiment, a guide plate 31 having a guide notch 30 which is higher at the left side through an inclined portion 29 from an introduction portion up to a base portion, is fixed to the fixedly mounted frame 17, and a holder having three shafts 32, 33 and 34 is fixed to the carriage 11. On the shaft 32 is rotatably mounted a detent gear 39 having a shaft portion 36, a toothed portion 37 and an eccentric hole 38, while on the shaft 33 is mounted a pawl 40 adapted to engage the toothed portion 37, and further mounted on the shaft 34 are a protective plate 42 provided in an intermediate portion thereof with a pin 41 and an L-shaped swing lever 45 provided at one end thereof with a pin 43 and at the other end with an engaging leg 44 adapted to engage the guide notch 30. Furthermore, an intermediate lever 46 is rotatably mounted on the shaft portion 36 of the detent gear 39. In the intermediate lever 46 there are formed inclined apertures 47 and 48 adapted to engage the pins 41 and 43, respectively.

In such a construction, when the carriage 11 is moved largely to the left, the engaging leg 44 of the swing lever 45 fits in the guide notch 30 and pivots the swing lever 45 in a clockwise direction when viewed from the left, whereby the intermediate lever 46 turns in a counterclockwise direction because the pin 43 engages the inclined aperture 48, and then the protective plate 42 is pivoted in a clockwise direction because the pin 41 engages the inclined aperture 47, thus allowing the protective plate 42 to move in a direction away from the platen 2. Therefore, the protective plate 42 neither strikes nor contacts the roller 20.

Figure 10:
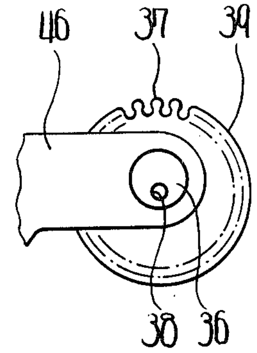
FIG. 10 is a side view of a portion at the time of adjustment.
Figure 11:
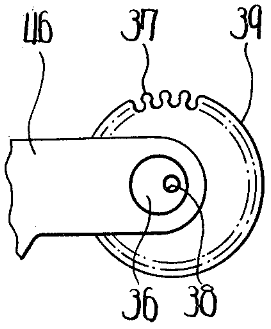
FIG. 11 is a side view of a portion showing another state at the time of adjustment.
Figure 12:
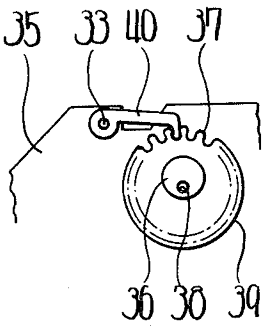
FIG. 12 is a side view showing a positioning state.
Figure 13:
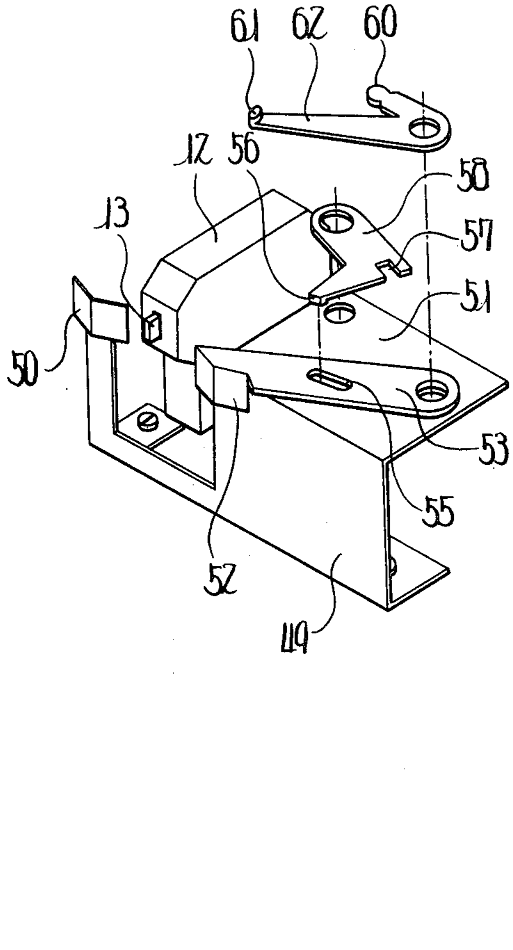
FIG. 13 is an exploded perspective view showing a third embodiment of the present invention.
Figure 14:
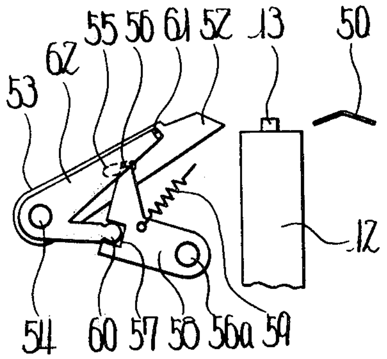
FIG. 14 is a plan view of a principal portion.
Figure 15:
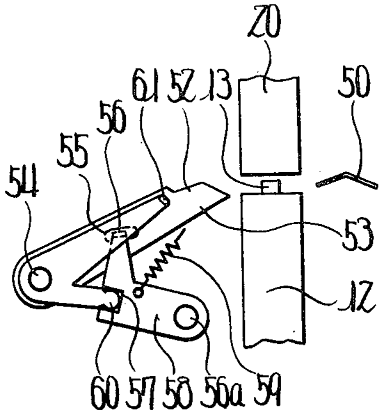
FIG. 15 is a plan view showing the relation between a protective plate and a set lever.
Figure 16:
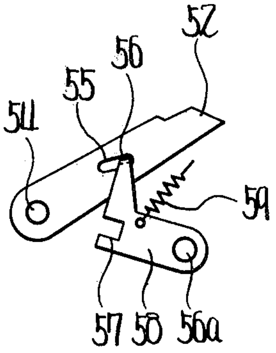
FIG. 16 is a plan view at the time of retreat of the protective plate.
Figure 17:
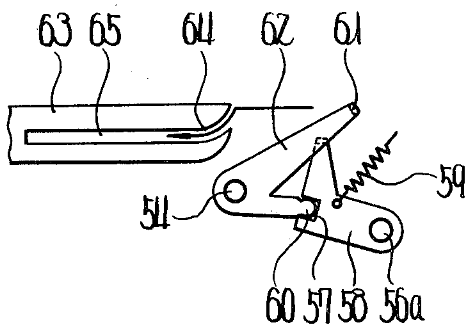
FIG. 17 is a plan view at the time of leftward movement of a carriage.
Figure 18:
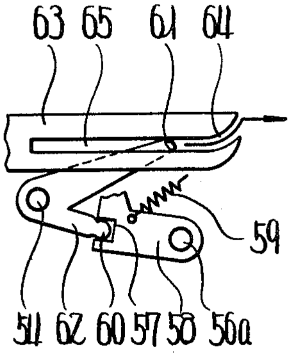
FIG. 18 is a plan view at the time of completion of such movement.

If the pawl 40 is disengaged from the toothed portion 37 and after turning the detent gear 39 the pawl 40 is again brought into engagement, then a displacement by a distance B results for example as shown in FIGS. 10 and 11, whereby the center of rotation of the intermediate lever 46 changes and the amount of retreat of the protective plate 42 is adjusted. Thus, the detent gear 39 having the eccentric hole 38 functions as an adjusting member, while the intermediate lever 46 and the swing lever 45 functions as parting member.

Referring now to FIGS. 13 through 18, there is shown a third embodiment of the present invention, in which a holder frame 49 having an opening portion formed in front of the printing head 12 is mounted to the carriage 11 which carries thereon the printing head 12 disposed in a central position. At one side of the holder frame 49 a protective plate 50 which projects toward the platen more than the nozzle surface 13 of the printing head 12 is formed and bent so that its central portion protrudes, while at the other side of the holder frame 49 there is formed a horizontal surface 51 on which is disposed a protective plate 53 having a protective surface 52 in a position symmetric to the protective plate 50 with respect to the nozzle surface 13, the protective plate 53 being pivotably mounted on a support shaft 54. In an intermediate portion of the protective plate 53 there is formed a long aperture 55 along its longitudinal direction. To the horizontal surface 51 is attached a support shaft **56*a* on which is mounted a set arm 58 pivotably while being urged in a clockwise direction when viewed from above by means of a spring 59, the set arm 58 serving as a parting member having not only a pawl 56 adapted to engage the long aperture 55 but also a fork-like engaging notch 57. Further mounted pivotably on the support shaft 54 is an actuating lever 62 having not only a circular actuating arm portion 60 adapted to engage the engaging notch 57 of the set arm 58 but also an upwardly projecting portion 61**.

To the frame 17 on the roller 20 side is fixed a guide plate 63 having a guide notch 65, the guide notch 65 being provided with a curved portion 64 which changes in position to this side along with advancement from its inlet portion toward the left.

In such a construction, when the carriage 11 is moved largely to the left, the projection 61 fits in the guide notch 65 and causes the actuating lever 62 to pivot in a clockwise direction, so that the set arm 58 is pivoted in a counterclockwise direction and the protective plate 53 is pivoted in a clockwise direction, whereby the protective surface 52 is moved in a direction away from the platen 2 so even when passing the roller 20 it never contacts the roller. Thus, both the roller 20 and the protective plate 53 are kept safe. In a stationary state, the printing head is opposed to the roller 20. In this state if a jetted ink droplet is held by both the surface of the roller 20 and the nozzle surface 13, the amount of ink jet is appropriate, and if the ink droplet is not so held therebetween, the amount of ink jet is short, while if the ink droplet drops, the amount of ink jet is too large. Therefore, the amount of ink jet is somewhat checked before printing.

In using the printer, the carriage 11 is moved to the right thereby allowing the printing head 12 to be opposed to the platen 2. At this time, the projection 61 is disengaged from the guide notch 65, so the protective surface 52 projects and cooperates with the other protective plate 50 to prevent floating of the printing paper 1 as guided by the platen 2, thus permitting a satisfactory ink jet printing.

Particularly when an external force is applied to the protective plate 53 for some reason or other, a force is exerted on the pawl 56 which engages the long aperture 55, and since this force acts from the pawl 56 toward the support shaft 56*a* which supports the set arm 58, the set arm 58 acts as a stopper to lock the protective plate 53. Thus, the protective plate 53 will never escape even when an external force is exerted threon.

What is claimed is:

1. A printing head protecting device in an ink jet printer having a platen for guiding a printing paper and a reciprocable carriage which carries thereon a printing head along the platen, said printing head protecting device comprising an ink receiving member for cleaning positioned so as to project a little more than the surface of said platen, a protective member positioned at least on said ink receiving member side of said printing head and projecting toward said platen, and a parting member for moving said protective member in a direction away from said platen before said printing head is opposed to said ink receiving member through its movement along said platen.

2. A printing head protecting device according to claim 1, wherein said protective member is formed of an elastic plate having elastic leg portions which project integrally from a base portion of said protective member fixed to said carriage, said elastic leg portions having protective surfaces positioned on both sides of a nozzle surface of said printing head.

3. A printing head protecting device according to claim 1, wherein said parting member for moving said protective member having elasticity in a direction away from said platen before reaching the position of said ink receiving member comprises a square bar guide having an inclined portion.

4. A printing head protecting device according to claim 1, wherein said protective member is provided at an intermediate portion thereof with a pin and it is mounted on a shaft pivotably, said pin being engaged with an inclined aperture formed in an intermediate lever which is pivoted by a swing lever, said swing lever, said swing lever being adapted to engage and disengage with respect to said parting member having a guide notch, said parting member being fixed on said ink receiving member side.

5. A printing head protecting device according to claim 1, wherein said protective member is disposed on both sides of a nozzle surface of said printing head each independently, with only the protective member disposed on said ink receiving member side being made movable.

6. A printing head protecting device in an ink jet printer having a platen for guiding a printing paper and a reciprocable carriage which carries thereon a printing head along the platen, said printing head protecting device comprising an ink receiving member for cleaning positioned at a side portion of said platen so as to project a little more than the surface of said platen, a protective member positioned at least on said ink receiving member side of said printing head and projecting toward said platen, a parting member for moving said protective member in a direction away from said platen before said printing head is opposed to said ink receiving member through its movement along said platen, and means for adjusting the amount of movement of said parting member.

7. A printing head protecting device according to claim 6, wherein said parting member comprises a square bar guide which is in the form of a prism having a multitude of ridges adapted to contact said protective member having elasticity, and said adjusting means is capable of fixing said square bar guide in any desired position about its axis.

8. A printing head protecting device according to claim 6, wherein said protective member is provided at an intermediate portion thereof with a pin and it is mounted on a shaft pivotably, said pin being engaged with an inclined aperture formed in an intermediate lever which is pivoted by a swing lever, said swing lever being adapted to engage and disengage with respect to said parting member having a guide notch, said parting member being fixed on said ink receiving member side, and said intermediate lever being pivotably mounted on a shaft portion of a detent gear having an eccentric hole.

9. A printing head protecting device in an ink jet printer having a platen for guiding a printing paper and a reciprocable carriage which carries thereon a printing head along the platen, said printing head protecting device comprising an ink receiving member for cleaning positioned at a side portion of said platen so as to project a little more than the surface of said platen, a protective plate positioned at least on said ink receiving member side of said printing head and projecting toward said platen, a set arm for moving said protective member in a direction away from said platen by pivoting in interlock with the movement of said printing head when the printing head moves toward said ink receiving member, and an actuating lever for actuating said set arm, the connection between said set arm and said protective member being set at an angle at which said protective member can be moved from said set arm and at which said set arm cannot be moved from said protective member, thereby allowing said set arm to act as a stopper for said protective member.

* * * * *